(12) United States Patent
Hanscom

(10) Patent No.: US 7,338,052 B2
(45) Date of Patent: Mar. 4, 2008

(54) TRAILER STABILIZING DEVICE AND METHOD OF USING SAME

(76) Inventor: Paul Hanscom, 9609 Lake Pyramid Ct., Bakersfield, CA (US) 93312

( * ) Notice: Subject to any disclaimer, the term of this patent is extended or adjusted under 35 U.S.C. 154(b) by 332 days.

(21) Appl. No.: 10/899,921

(22) Filed: Jul. 26, 2004

(65) Prior Publication Data

US 2006/0017241 A1   Jan. 26, 2006

(51) Int. Cl.
*B60S 9/02* (2006.01)
(52) U.S. Cl. .................. 280/6.153; 14/71.3; 248/351; 254/418
(58) Field of Classification Search ............ 280/6.153, 280/763.1, 35, 455.1, 456.1, 762, 764.1, 280/765.1, 766.1, 414.5, 475, 746.1; 14/71.3; 248/351, 352, 354.1, 354.3, 354.5, 439; 108/169; 290/475; 249/24; 254/101, 419, 254/424, 418, 45; 414/401; 340/431; 52/167.1, 52/169.12, 23
See application file for complete search history.

(56) References Cited

U.S. PATENT DOCUMENTS

| | | | |
|---|---|---|---|
| 2,361,690 A * | 10/1944 | Hunz ........................ 254/110 |
| 2,571,067 A * | 10/1951 | Seckendorf .............. 254/133 R |
| 2,572,410 A * | 10/1951 | Van Doorne ............. 280/763.1 |
| 2,926,889 A * | 3/1960 | Obes ........................ 254/419 |
| 3,096,065 A * | 7/1963 | Horn ........................ 248/354.3 |
| 3,169,012 A * | 2/1965 | Fagan ........................ 254/419 |
| 3,281,160 A * | 10/1966 | Vinther et al. ............. 254/420 |
| 3,367,614 A | 2/1968 | Leonard |
| 3,475,008 A * | 10/1969 | Taylor ........................ 254/424 |
| 3,536,337 A * | 10/1970 | Molnar ..................... 280/764.1 |
| 3,537,724 A * | 11/1970 | Matthews ................ 280/763.1 |
| 3,656,778 A * | 4/1972 | Bristol ..................... 280/763.1 |
| 3,690,694 A * | 9/1972 | Herndon et al. ......... 280/763.1 |
| 3,791,676 A * | 2/1974 | Spratlen ..................... 280/475 |
| 3,823,958 A * | 7/1974 | Trejbal ..................... 280/763.1 |
| 3,836,173 A * | 9/1974 | Schwaiger ............... 280/763.1 |
| 3,874,696 A * | 4/1975 | Gardner et al. ............. 254/419 |
| 3,933,372 A * | 1/1976 | Herndon ................... 280/763.1 |
| 4,097,840 A * | 6/1978 | Chappelle ................... 340/431 |
| 4,218,094 A * | 8/1980 | Leaver ..................... 298/17 B |
| 4,268,066 A * | 5/1981 | Davis ....................... 280/763.1 |
| 4,340,100 A * | 7/1982 | Anderson, II ............... 269/41 |
| 4,429,851 A * | 2/1984 | DeJager ................... 248/354.5 |
| 4,562,673 A * | 1/1986 | Barari ........................ 52/167.1 |
| 4,596,196 A * | 6/1986 | Gunter et al. ............... 108/169 |
| 4,611,948 A * | 9/1986 | Johnson ................... 403/232.1 |
| 4,708,362 A * | 11/1987 | Raetz ....................... 280/763.1 |
| 4,997,203 A * | 3/1991 | Jensen ..................... 280/763.1 |

(Continued)

*Primary Examiner*—Paul N. Dickson
*Assistant Examiner*—Karen J. Amores
(74) *Attorney, Agent, or Firm*—Burns & Levinson LLP; Jacob N. Erlich

(57) ABSTRACT

An apparatus and method for stabilizing a stationary trailer. One embodiment of the device comprises a jack and a stabilizing member. The jack attaches to the bottom of the trailer, such that when the jack is extended, a base component of the jack engages the ground. A stabilizing member attaches at one end to the base of the jack and attaches at the other end to the bottom of the trailer. The length of the stabilizing member adjusts such that the stabilizing member has one length when the jack is in the raised position, and a second length when the jack is in the lowered position. The length of the stabilizing member may be locked such that the stabilizing member retains a particular length.

30 Claims, 8 Drawing Sheets

U.S. PATENT DOCUMENTS

| | | | | |
|---|---|---|---|---|
| 5,111,632 A * | 5/1992 | Turner | | 52/702 |
| 5,137,297 A * | 8/1992 | Walker | | 280/414.5 |
| 5,205,586 A * | 4/1993 | Tallman | | 280/764.1 |
| 5,217,209 A * | 6/1993 | Anders | | 254/419 |
| 5,348,330 A * | 9/1994 | Few et al. | | 280/475 |
| 5,409,251 A * | 4/1995 | Thorndyke | | 280/475 |
| 5,474,330 A * | 12/1995 | Meehleder | | 280/763.1 |
| 5,509,687 A * | 4/1996 | Thorndike | | 280/766.1 |
| 5,527,054 A * | 6/1996 | Williams | | 280/475 |
| 5,575,492 A * | 11/1996 | Stone | | 280/475 |
| 5,575,493 A * | 11/1996 | Schwartz et al. | | 280/475 |
| 5,901,980 A * | 5/1999 | Few et al. | | 280/763.1 |
| 5,984,342 A * | 11/1999 | Ysker | | 280/492 |
| 6,062,524 A * | 5/2000 | Jackson, Sr. | | 248/352 |
| 6,095,474 A * | 8/2000 | Arnold | | 248/352 |
| 6,139,056 A * | 10/2000 | Sourdeau | | 280/763.1 |
| 6,142,488 A * | 11/2000 | Orr | | 280/6.153 |
| 6,309,165 B1 * | 10/2001 | Hahn et al. | | 414/401 |
| 6,331,016 B1 * | 12/2001 | Wallace et al. | | 280/763.1 |
| 6,494,487 B1 * | 12/2002 | Nebel | | 280/765.1 |
| 6,629,701 B1 * | 10/2003 | Colibert | | 280/455.1 |
| 6,695,348 B2 * | 2/2004 | Holly | | 280/763.1 |
| 6,726,236 B2 * | 4/2004 | Cofer | | 280/475 |
| 6,973,693 B1 * | 12/2005 | Mayer et al. | | 14/71.3 |
| 7,073,763 B1 * | 7/2006 | Trout | | 248/352 |
| 7,128,330 B2 * | 10/2006 | Krauss | | 280/456.1 |
| 2005/0110260 A1 * | 5/2005 | Jacques | | 280/763.1 |
| 2006/0081755 A1 * | 4/2006 | Thorpe | | 248/354.1 |
| 2006/0214390 A1 * | 9/2006 | Pinnell, III | | 280/475 |
| 2007/0040370 A1 * | 2/2007 | Hanscom | | 280/763.1 |
| 2007/0114734 A1 * | 5/2007 | Jacques | | 280/6.153 |

* cited by examiner

US 7,338,052 B2

TRAILER STABILIZING DEVICE AND METHOD OF USING SAME

BACKGROUND OF THE INVENTION

The present invention generally relates to trailer stabilizing devices and more specifically to devices and methods which allow a person to stabilize a trailer with stabilizing members which allow the trailer to be transported without removal of the stabilizing members.

A variety of different stabilizers are known for supporting stationary trailers, which stabilize the trailer and reduce movement of the trailer as people move within the trailer, thus making the trailer more comfortable for the occupants. Many of the known stabilizers must be installed after the trailer is set in place, requiring the positioning and installation of heavy pieces of equipment. Other known stabilizers are complicated, requiring crossing stabilizing bars or other elaborate supports.

The apparatus and method disclosed herein address these problems. The disclosed apparatus may be affixed to the bottom of a trailer and left attached when the trailer is being transported. The apparatus is relatively simple, and does not require crossed stabilizing bars.

SUMMARY OF THE INVENTION

The present invention is directed to a device for stabilizing a stationary trailer. The trailer being of the type having a top and a bottom defining a vertical axis, a front and a back defining a longitudinal axis, a first side and a second side defining a transverse axis perpendicular to the longitudinal axis, and ground engaging wheels attached to the bottom. One embodiment of the device comprises a first jack and a stabilizing member. In this embodiment, the first jack comprises a first trailer engagement means, a first base, and a first extension means disposed between the first trailer engagement means and the first base. The first trailer engagement means is attached to the bottom of the trailer, such that the first extension means causes the first base to extend from a raised position generally adjacent to the bottom of the trailer to a first extended position, where the first base either engage the ground, or engages some other intermediate structure which, in turn, engages the ground. The stabilizing member comprises a first end and a second end. The first end comprises means for attachment to the first base and the second end comprises means for attachment to the bottom of the trailer. The stabilizing member further comprises length adjustment means such that the stabilizing member has a first length when the first jack is in the raised position and the stabilizing member has a second and longer length when the first jack is in the first extended position. The stabilizing member also has length locking means for retaining the stabilizing member at a particular length.

In another embodiment the device comprises two or more jacks of the above description. Other embodiments identify, among other things, particular trailer engagement means, extension means, means for attachment of the stabilizer to the first base and to the bottom of the trailer. Also disclosed is a method of using an embodiment of the device for stabilizing a trailer.

DETAILED DESCRIPTION OF THE EMBODIMENTS

Figure 1:
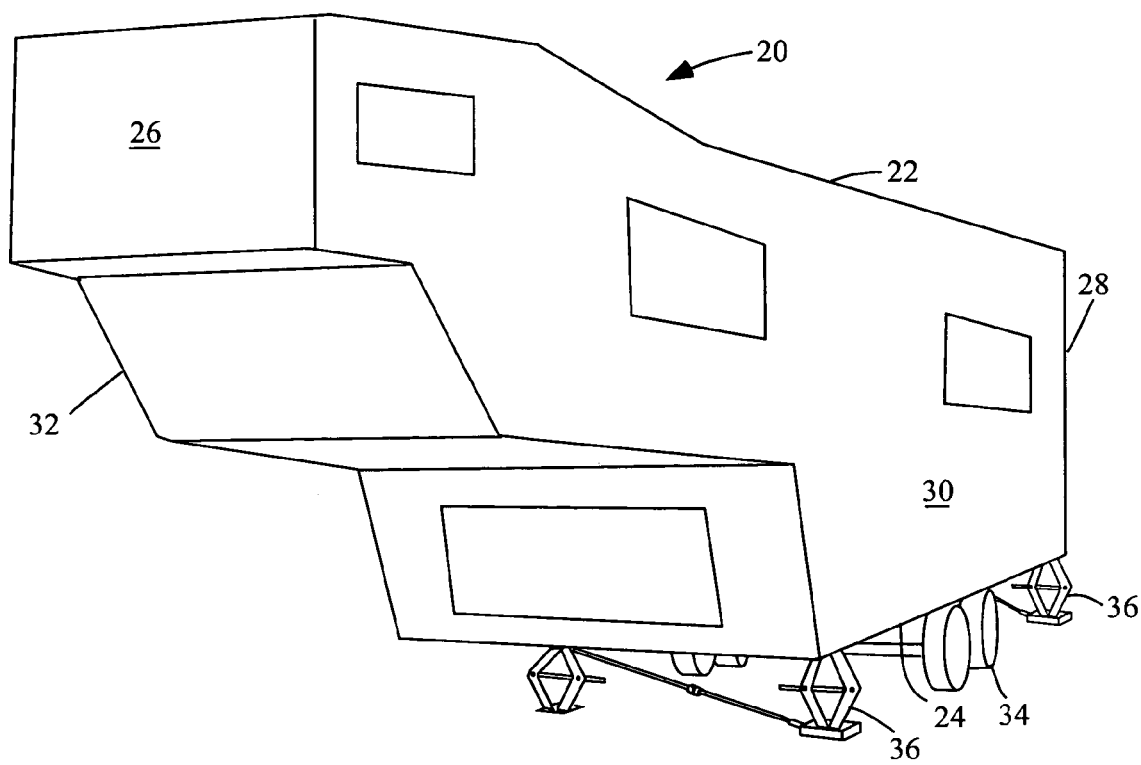
FIG. 1 is a schematic of a trailer, showing how one embodiment of the device may be installed.

Referring now specifically to the drawings, FIG. 1 shows a schematic of a trailer 20 with an embodiment of the stabilizing device installed. The trailer 20 is of the type having a top 22 and a bottom 24 defining a vertical axis, a front 26 and a back 28 defining a longitudinal axis, a first side 30 and a second side 32 defining a transverse axis perpendicular to the longitudinal axis, and ground engaging wheels 34 attached to the bottom 24. As shown in FIG. 1, scissor jacks 36 may be a component of this embodiment. Many trailers 20 come pre-equipped with leveling mechanisms of various types, including scissor jacks 36, which are attached to the bottom 24 of the trailer. Other leveling mechanisms may include mechanically, hydraulicly, pneumatically, and electrically actuated jacks. The leveling mechanisms are employed to bring the trailer to a relatively level orientation for the comfort of those inside. However, the leveling mechanisms are generally not sufficient on their own to prevent excessive motion of the trailer 20 as people move about inside. The present stabilizing device may incorporate various leveling mechanisms, including those listed above, to improve the stability of the trailer.

Figure 2:
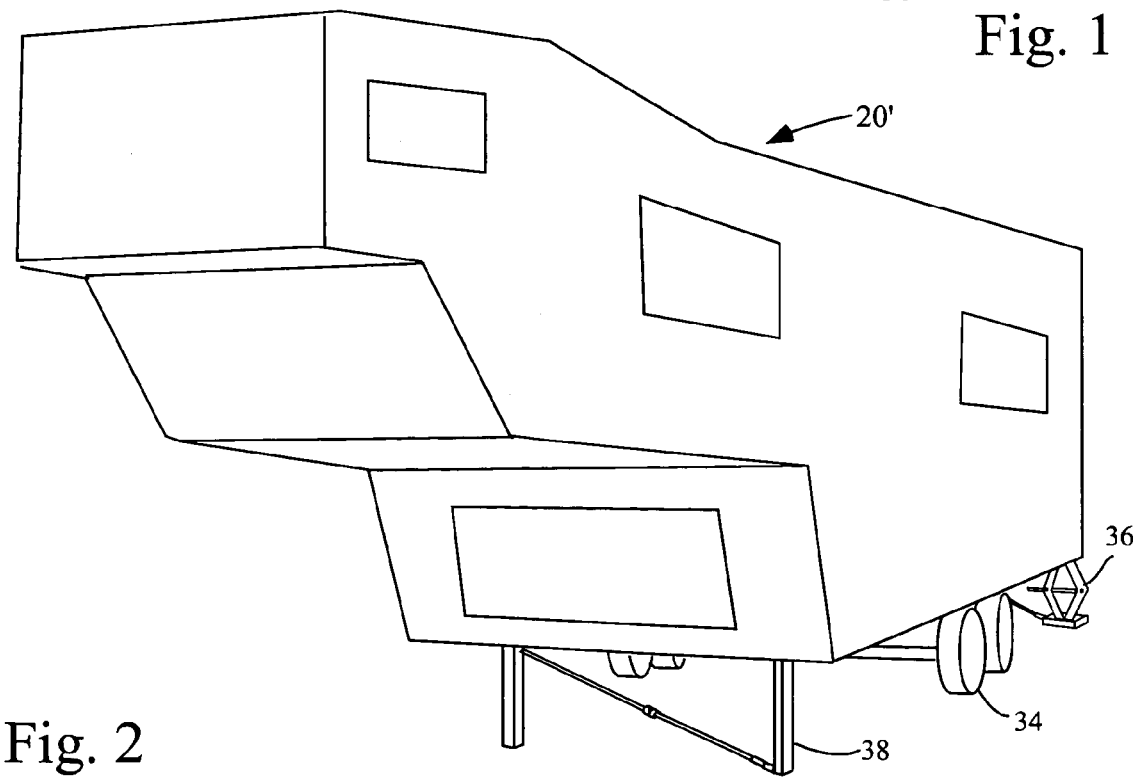
FIG. 2 is a schematic of a trailer, showing how a second embodiment of the device may be installed.

FIG. 2 shows a schematic of a trailer 20' which utilizes a landing gear 38 to support the front 26 of the trailer. As shown in FIG. 2, a second embodiment of the stabilizing device may incorporate landing gear 38. As shown in FIG. 2, trailer 20' may still utilize a combination of embodiments of the device, according to the configuration of a particular trailer. For example, FIG. 2 shows an embodiment of the device utilizing landing gear while a different embodiment utilizes scissor jacks 36.

Figure 3:
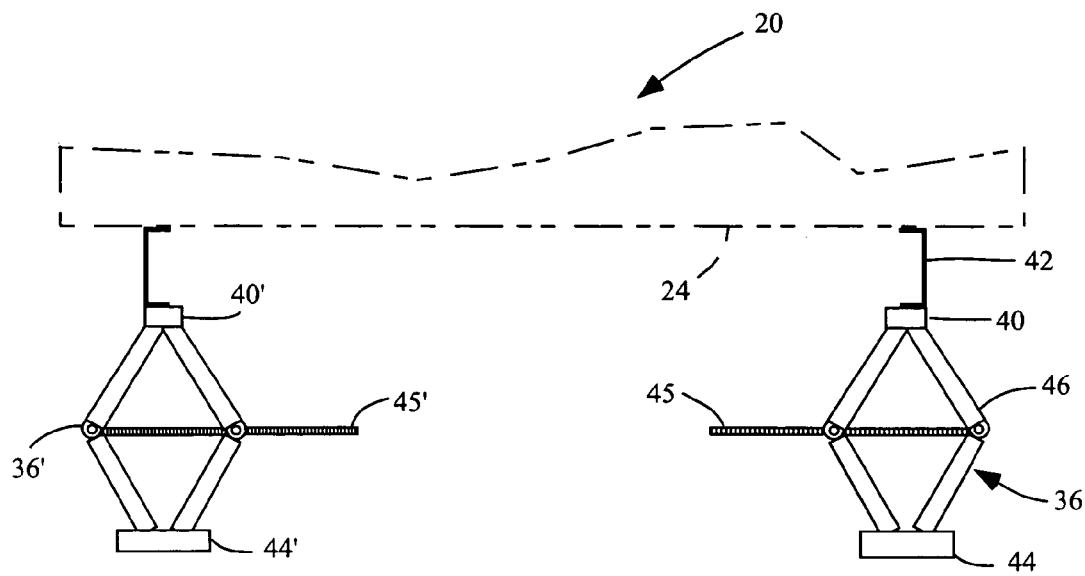
FIG. 3 shows one variety of jack which may be used in an embodiment of the invention.

FIG. 3 shows a first jack 36 and a second jack 36' which may be used in an embodiment of the invention. While different types of jacking mechanisms may be employed for the first jack as compared to the second jack, the first jack 36 and second jack 36' depicted in FIG. 3 have the same basic components. As shown in FIG. 3, the components of each scissor jack comprise engagement plate 40 which engages structural member 42 of the trailer 20. The scissor jack further comprises a base 44 and a scissor mechanism 46 disposed between the engagement plate 40 and the base 44. The scissor mechanism may be engaged by rotation of turn-screw 45. However, it is to be appreciated that first jack 36 and/or second jack 36' may also be of the other known types of jacking devices, such as screw, hydraulic, pneumatic, electric, etc. It is also to be appreciated that base 44 may either be ground engaging, or, alternatively, engage a block or other intermediate structure disposed between the ground and the base 44.

Figure 4:
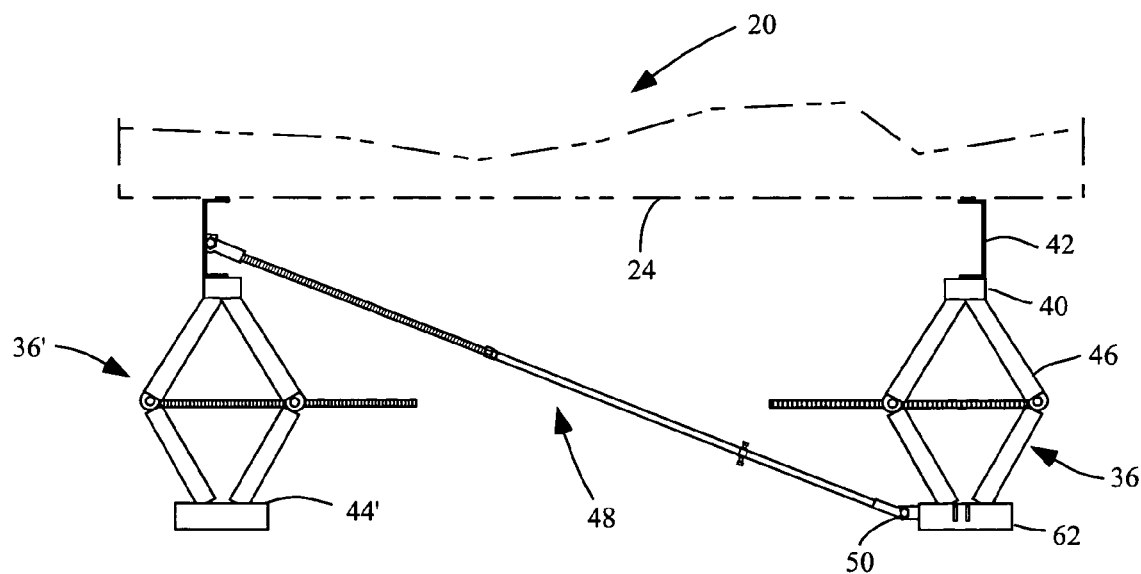
FIG. 4 shows an embodiment of the disclosed device where the stabilizing member attaches to a support member on the bottom of the trailer.

FIG. 4 shows a first embodiment of the device in greater detail. While FIG. 4 shows this embodiment utilizing two scissor jacks 36, 36', it is to be appreciated that for this embodiment a single scissor jack may be employed. In this embodiment of the apparatus, a first jack 36 comprises a first trailer engagement means, such as the engagement plate 40. Engagement plate 40 is attached to structural member 42, which is at the bottom 24 of the trailer 20.

The first jack 36 of the first embodiment comprises a first base 44 (shown in FIG. 3) which, for the embodiment shown in FIG. 4, is contained within enclosure 62. The first jack comprises a first extension means, such as a scissor mechanism 46, disposed between the engagement plate 40 and the base 44. The first extension means, in this case the scissor mechanism 46, causes the base 44 to extend from a raised position generally adjacent to the bottom 24 of the trailer 20 to a first extended position, in which the base may either directly engage the ground surface, or, alternatively, engage an intermediate structure, such as a block, which rests on the ground surface. It is to be appreciated that the various known extensions means, such as hydraulic rams, mechanical screws, etc. may be employed in place of the scissor jacks generally depicted in the Figures.

This embodiment further comprises a stabilizing member 48, which extends from base 44 to the structural member 42 at the bottom 24 of the trailer 20. FIGS. 10 through 12 and 15 show a variety of different stabilizing members, respectively 48, 48', 48" and 48'". (Unless otherwise specified, the reference to stabilizing member 48 shall refer to any one of these.)

Figure 8:
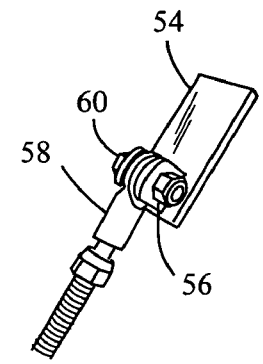
FIG. 8 shows an end piece for the stabilizing member which may be used as a means for attachment of the stabilizing member to a jack and also as a means for attachment to the bottom of the trailer.

The stabilizing member 48 comprises a first end 50 and a second end 52. The first end 50 comprises means for attachment to the base 44. Various means for attachment to the base 44 may be employed, such as those shown in FIG. 10 and FIG. 11. The attachment means shown in FIG. 10 comprises a first plate 54 pivotally attached to the first end 50 of the stabilizing member 48. First plate 54 may be welded, bolted or otherwise fastened to base 44. As shown in FIG. 8, first plate 54 may have a mounting bracket 56 which attaches to a connector 58 with fastener 60. Alternatively, the means for attachment to base 44 may comprise the enclosure 62 shown in FIGS. 9, 11 and 12. The enclosure 62 may generally conform to the shape of the base 44 and enclose the base. The enclosure 62 may be pivotally attached to the stabilizing member 48' or 48" as shown in FIGS. 10 and 11.

Figure 6:
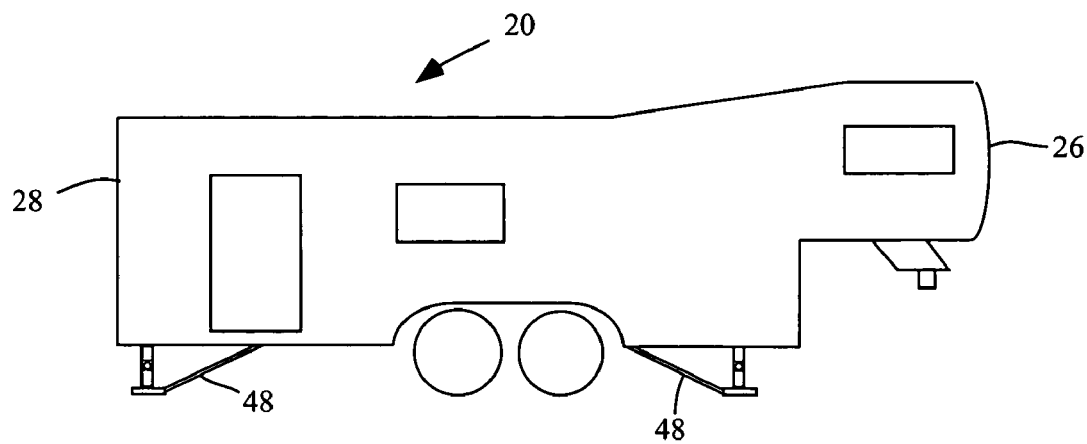
FIG. 6 shows an embodiment of the disclosed device, where an embodiment of the stabilizing member is aligned along the longitudinal axis of the trailer.
Figure 7:
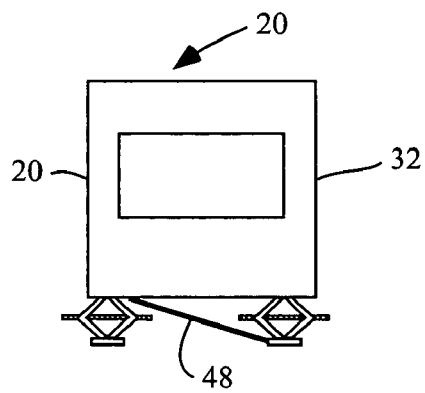
FIG. 7 is a schematic of the back of a trailer, where an embodiment of the stabilizing member is aligned along the transverse axis of the trailer.
Figure 9:
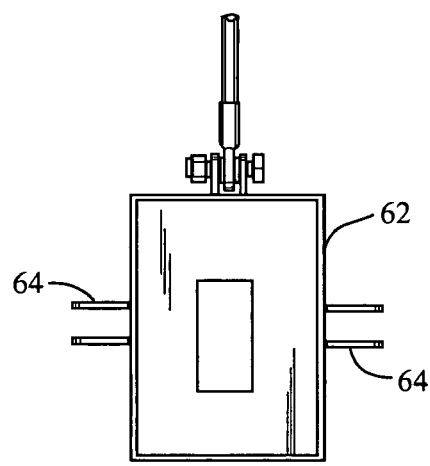
FIG. 9 shows one embodiment for attachment of the stabilizing member to the base of a jack.
Figures 10, 11, 12:
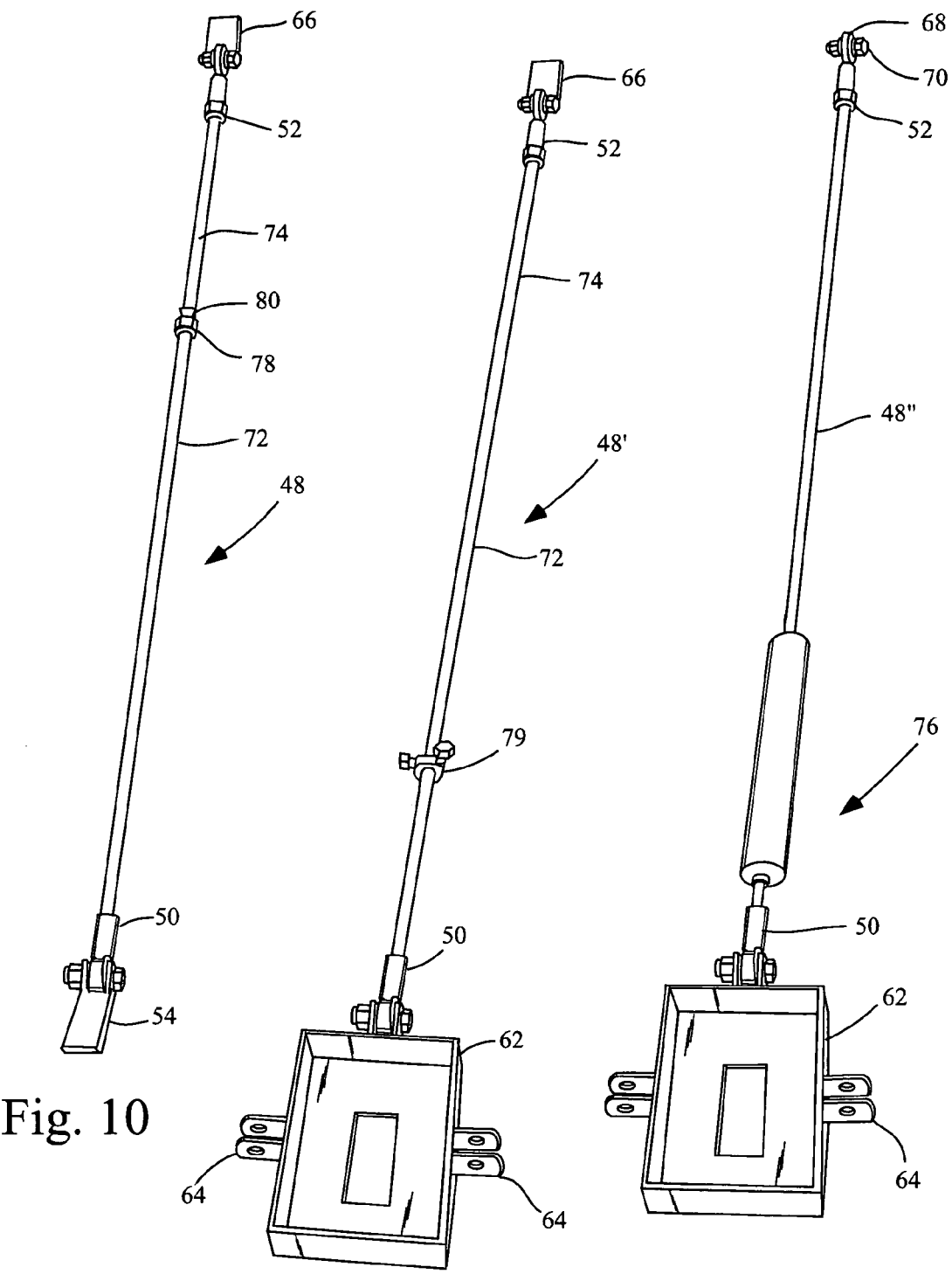
FIGS. 10 through 14 show different embodiments of the stabilizing member.

As shown in FIGS. 9, 11 and 12, the enclosure 62 may also comprise additional stabilizer attachment plates 64. The attachment plates 64 facilitate the attachment of multiple stabilizing members 48 to a single base 44 and/or changing the orientation of the stabilizing member(s). For example, if desired, stabilizing members 48 may be oriented along the longitudinal axis of the trailer 20 as shown in FIG. 6 or oriented along the transverse axis of the trailer as shown in FIG. 7.

Figure 5:
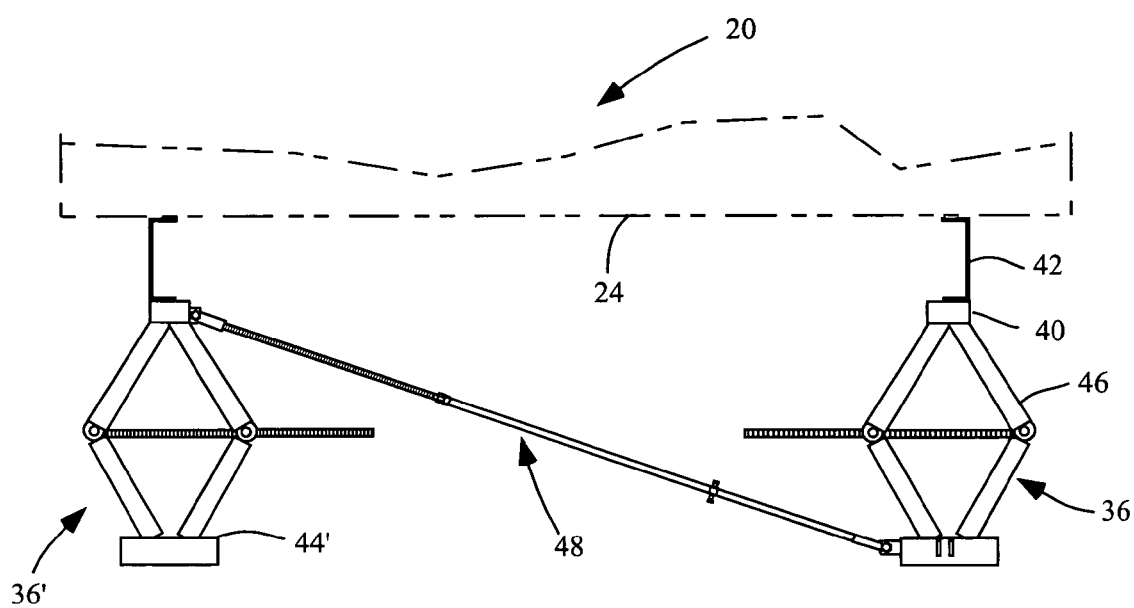
FIG. 5 shows an embodiment of the disclosed device where the stabilizing member attaches between two jacks.

The second end 52 of the stabilizing member 48 may comprise means for attachment to the bottom 24 of the trailer, as shown in FIG. 4. Alternatively, where a second jack 36' is utilized, the second end 52 may be attached to the engagement plate 40' as shown in FIG. 5. As shown in FIG. 10, the means for attachment to the bottom 24 of the trailer or to the second jack 36 may comprise a second plate 66 pivotally attached to the second end 52 of the stabilizing member 48. Alternatively, as shown in FIG. 12, the means for attachment to the bottom 24 of the trailer 24 or to second jack 36 may comprise end piece 68 having fastener 70.

Stabilizing member 48 may further comprise length adjustment means. The length adjustment means function such that the stabilizing member 48 has a first length when the first jack 36 is in the raised position and the stabilizing member has a second length when the first jack is in the first extended position. The length adjustment means may comprise telescoping sub-members of the stabilizing member 48. As shown in FIGS. 10 and 11, the stabilizing member 48 may have a first sub-member 72 and a second sub-member 74, where the first sub-member is slidably inserted within the second sub-member. As the extension means of the first jack 36 is manipulated such that base 44 is extended in a downward direction away from the bottom 24 of the trailer 20, the length of stabilizing member 48 must increase as the distance between the base of the first jack and the anchor point of the second end 52 increases.

Alternatively, the length adjustment means may be fashioned by fabricating the stabilizing member 48" to have an integral piston-cylinder 76 as shown in FIG. 12. In this embodiment, a piston retracts into a cylinder when the stabilizing member 48" is adjusted to a shorter length and the piston extends from the cylinder when the stabilizing member is adjusted to a longer length.

Once the base 44 of the first jack engages the ground or an intermediate supporting structure, the length of the stabilizing members 48 shown in FIGS. 10 through 14 must be locked to provide the desired stabilizing effect. Therefore, the stabilizing member 48 may further comprise length locking means. The proper length locking means depends upon the type of length adjustment means which is employed. For the stabilizing member 48 shown in FIG. 10 and the stabilizing member 48' shown in FIG. 11, the length locking means may comprise a locking nut 78 and bushing 80. As shown in FIG. 11, other types of locking arrangements, such as lock bolt and clamp 79 may be employed for this purpose.

Figure 13:
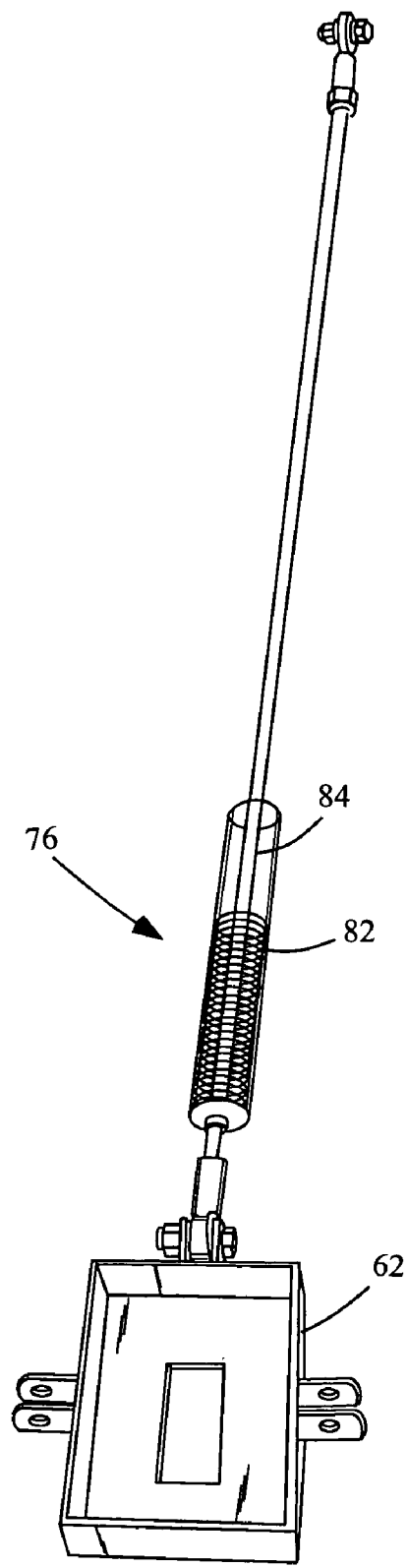

For the stabilizing member 48" shown in FIG. 12, which utilizes cylinder 76, two different length locking means may be used. As shown in FIG. 13, the length locking means may comprise a spring 82 biasing (i.e., locking) the piston 84 in an extended position. The spring may be assisted by gas contained within the cylinder 76.

Figure 14:
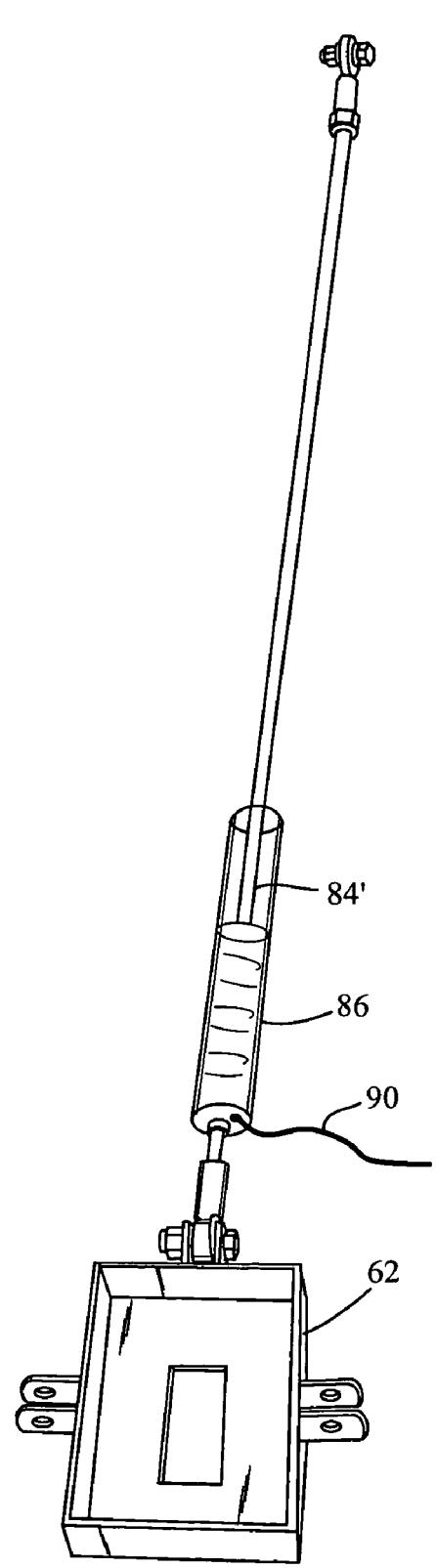

Alternatively, as shown in FIG. 14, the length locking means may comprise a fluid 86 which biases the piston 84' in an extended position. The fluid may comprise either hydraulic fluid for hydraulic operation or a suitable gas for pneumatic operation. The hydraulic fluid or gas may be introduced into the cylinder by means of lines 90.

Figures 15, 16:
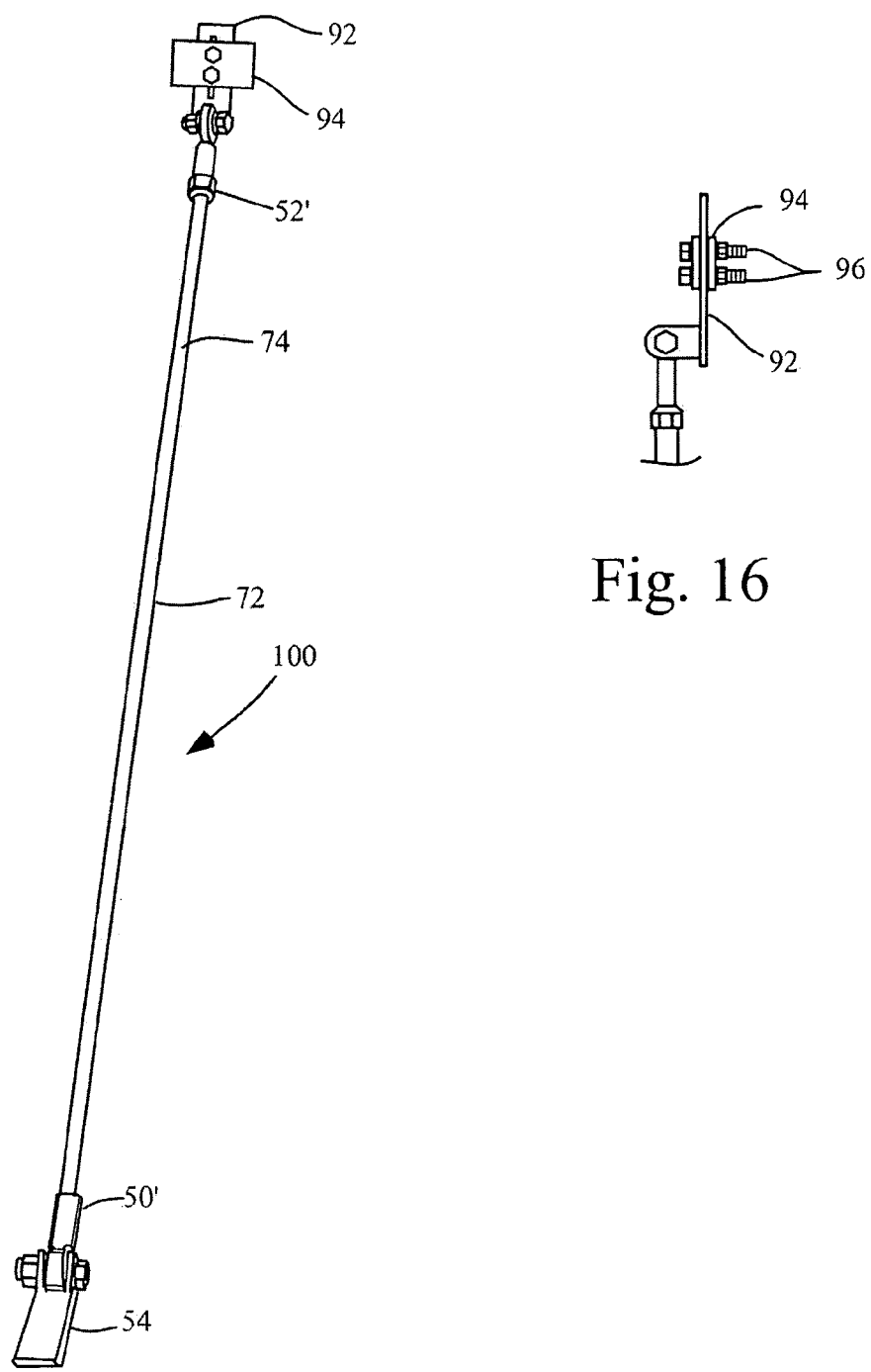
FIGS. 15 and 16 show a stabilizing member having an extension member which attaches to either the bottom of the trailer or to a jack.

Another embodiment of the device comprises, as before, a first jack 36 having a first extension means, such as a scissor mechanism 46, disposed between the engagement plate 40 and the base 44. As shown in FIG. 15, the stabilizing member 48'" comprises a first end 50' and a second end 52'.

As before, the first end 50' comprises means for attachment to the first base 44. The same means for attachment to the base 44 as used in other embodiments may be employed, such as those shown in FIG. 10 and FIG. 11. Second end 52' comprises means for attachment to the bottom 24 of the trailer, as shown in FIGS. 15 and 16, wherein the means for attachment comprises an extension member pivotally attached to the second end 52'. The extension member may comprise a slotted plate 92 which attaches to receiving bracket 94 with fasteners 96 such as nuts and bolts. Receiving bracket 94 may be attached to the bottom 24 of the trailer or attached to the engagement plate 40' of the second jack 36' with bolts, welding, or other fastening means. Alternatively, the stabilizing member 48''' may be turned around and the receiving bracket attached to first jack 36.

The receiving bracket 94 is adapted to slidably engage the slotted plate 92 such that the slotted plate is located at a first position with respect to the receiving bracket when the first jack 36 is in the raised position and the slotted plate is located at a second position with respect to the receiving bracket when the first jack is in the first extended position. The receiving bracket 94 comprises locking means, such as fasteners 96 for retaining the slotted plate 92 in the second position. Although FIG. 15 shows slotted plate 92 having a relatively short slot, it is to be appreciated that the length of the slot in slotted plate 92 may be adjusted as required by a particular application.

The embodiment of the stabilizer shown in FIG. 15 and FIG. 16 is used in conjunction with a first jack 36, shown for example in FIG. 3. The length of stabilizing member 48''' between the first base 44 and the receiving bracket 94 has a first length when the first jack 36 is in the raised position. However, as the first jack 36 extends, slotted plate 92 slides with respect to receiving bracket 94. Once the first base 44 engages the ground or other intermediate supporting structure, the fasteners 96 are tightened to lock the slotted plate 92 in position and fixing the stabilizing member 48''' into place.

Figure 17:
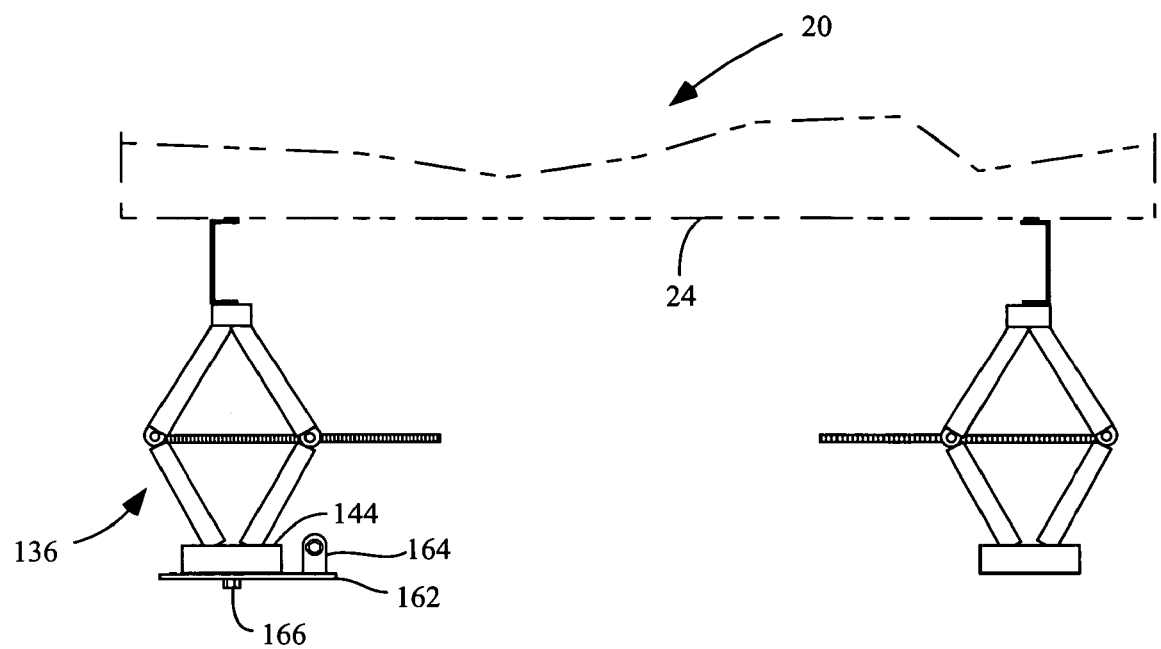
FIG. 17 shows an apparatus which allows the stabilizing member to be pivoted around the base of the jack.

FIG. 17 shows an alternative embodiment for attaching a stabilizing member 48 to the base plate 144 of a jack 136. In this embodiment, pivot plate 162 is pivotally attached to the base plate 144 by means known to those skilled in the art, including a single fastener 166, which allows pivot plate 162, and the attached stabilizing member 48, to pivot with respect to base plate 144. Stabilizing member 48 may be attached to attachment bracket 164 of the pivot plate 162. The pivotal attachment of the stabilizing member 48 to jack 136 allows the user, when the base plate 144 is not engaging the ground surface or an intermediate structure, to pivot the stabilizing member in a 360 degree rotation about the base plate 144, allowing the user greater flexibility in orienting the stabilizing member 48 for attachment to the trailer 20, or for securing the stabilizing member during transportation of the trailer.

Figure 18:
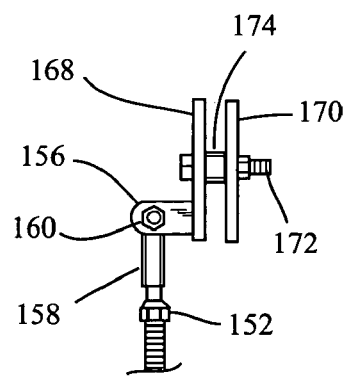
FIG. 18 shows an apparatus which allows the stabilizing member to be pivoted around the bottom of the trailer.

FIG. 18 shows an alternative embodiment for attaching the second end 152 to the bottom of the trailer. As shown in FIG. 18, the means for attachment to the bottom 24 of the trailer 20 may comprise a second plate 168 pivotally attached to the second end 152 of the stabilizing member 48. As shown in FIG. 18, second plate 168 may have a mounting bracket 156 which attaches to a connector 158 with fastener 160. Second plate 168 is pivotally attached to mounting plate 170 by pivotal attachment means, such as the bolt 172 and bearing 174 combination shown in FIG. 18. Mounting plate 170 is attached to the bottom 24 of the trailer. The pivotal attachment of the stabilizing member 48 to the bottom 24 of the trailer 20 allows the user to pivot the stabilizing member in a 360 degree rotation about the bottom of the trailer allowing the user greater flexibility in orienting the stabilizing member 48 for attachment to a jack 36 or for securing the stabilizing member during transportation of the trailer.

The apparatus disclosed herein may be employed as a method of stabilizing a stationary trailer. In this method, the trailer is positioned at a desired location. The first jack 36 is thereafter manipulated to engage extension means, causing the base 44 of the jack to extend from a raised position generally adjacent to the bottom of the trailer to a first extended position, where the base either engages the ground or an intermediate structure supported by the ground. As the base 44 extends downwardly, the length of stabilizing member 48 increases. Once base 44 engages either the ground or the intermediate support structure, the length of the stabilizing member is locked, either manually by manipulating lock nut 78, or automatically by action of either a spring, hydraulic action, electric action or pneumatic action.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A device for stabilizing a stationary trailer, the trailer having a top and a bottom defining a vertical axis, a front and a back defining a longitudinal axis, a first side and a second side defining a transverse axis perpendicular to the longitudinal axis, and ground engaging wheels attached to the bottom, the device comprising:

a first jack comprising a first trailer engagement means, a first base, and a first extension means disposed between the first trailer engagement means and the first base, wherein the first trailer engagement means is attached to the bottom of the trailer and wherein the first extension means causes the first base to extend from a raised position generally adjacent to the bottom of the trailer to a first extended position;

a stabilizing member comprising a first end and a second end, wherein the first end comprises means for attachment to the first base, wherein the means for attachment to the first base comprises an enclosure which generally conforms to the shape of the first base and encloses the first base wherein the stabilizing member is pivotally attached to the enclosure, and the second end comprises means for attachment to the bottom of the trailer, the stabilizing member further comprising length adjustment means wherein the stabilizing member has a first length when the first jack is in the raised position and the stabilizing member has a second length when the first jack is in the first extended position; and the stabilizing member further comprising length locking means.

2. The device of claim 1 wherein the means for attachment to the first base comprises a first plate pivotally attached to the first end of the stabilizing member, wherein the first plate is affixed to the first base.

3. The device of claim 1 wherein the means for attachment to the bottom of the trailer comprises a second plate pivotally attached to the second end of the stabilizing member, wherein the second plate is affixed to the bottom of the trailer.

4. The device of claim 1 wherein the first trailer engagement means comprises a first engagement plate.

5. The device of claim 1 wherein the means for attachment to the first base comprises a plate attached to the first base, wherein the stabilizing member is pivotally attached to the plate.

6. The device of claim 1 wherein the first extension means comprises scissor arms extended by operation of a turn-screw.

7. The device of claim 1 wherein the length adjustment means comprises the stabilizing member having a first sub-member and a second sub-member, the first sub-member slidably inserted within the second sub-member.

8. The device of claim 7 wherein the length locking means comprises a locking nut.

9. The device of claim 1 wherein the length adjustment means comprises the stabilizing member having an integral piston and cylinder, wherein the piston retracts into the cylinder when the stabilizing member is adjusted to a shorter length and the piston extends from the cylinder when the stabilizing member is adjusted to a longer length.

10. The device of claim 9 wherein the length locking means comprises a spring biasing the piston in an extended position.

11. The device of claim 9 wherein the length locking means comprises hydraulic fluid biasing the piston in an extended position.

12. A device for stabilizing a stationary trailer, the trailer having a top and a bottom defining a vertical axis, a front and a back defining a longitudinal axis, a first side and a second side defining a transverse axis perpendicular to the longitudinal axis, and ground engaging wheels attached to the bottom, the device comprising:

a first jack comprising a first trailer engagement means, a first base, and a first extension means disposed between the first trailer engagement means and the first base, wherein the first trailer engagement means is attached to the bottom of the trailer and wherein the first extension means causes the first base to extend from a raised position generally adjacent to the bottom of the trailer to a first extended position; and a stabilizing member comprising a first end and a second end, wherein the first end comprises means for attachment to the first base and the second end comprises means for attachment to the bottom of the trailer, wherein the means for attachment to the bottom of the trailer comprises an extension member comprising a slotted plate pivotally attached to the second end, the stabilizing member further comprising length adjustment means wherein the stabilizing member has a first length when the first jack is in the raised position and the stabilizing member has a second length when the first jack is in the first extended position.

13. The device of claim 12 wherein a plate is attached to the first base, wherein the stabilizing member is pivotally attached to the plate.

14. The device of claim 12 wherein the first trailer engagement means comprises a first engagement plate.

15. The device of claim 12 wherein the first extension means comprises scissor arms extended by operation of a turn-screw.

16. The device of claim 12 wherein the length adjustment means comprises the extension member having a axially aligned slot, wherein the extension member is attached to a receiving bracket attached to the bottom of the trailer wherein the extension member is located at a first position with respect to the receiving bracket when the first jack is in the raised position and the extension member is located at a second position with respect to the receiving bracket when the first jack is in the first extended position.

17. The device of claim 12 wherein the length adjustment means comprises the stabilizing member having an integral piston and cylinder, wherein the piston retracts into the cylinder when the stabilizing member is adjusted to a shorter length and the piston extends from the cylinder when the stabilizing member is adjusted to a longer length.

18. The device of claim 17 wherein the length locking means comprises a spring biasing the piston in an extended position.

19. The device of claim 17 wherein the length locking means comprises a fluid biasing the piston in an extended position.

20. A device for stabilizing a stationary trailer, the trailer having a top and a bottom defining a vertical axis, a front and a back defining a longitudinal axis, a first side and a second side defining a transverse axis perpendicular to the longitudinal axis, and ground engaging wheels attached to the bottom, the device comprising: a first jack comprising a first trailer engagement means, a first base, and a first extension means disposed between the first trailer engagement means and the first base, wherein the first trailer engagement means is attached to the bottom of the trailer and wherein the first extension means causes the first base to extend from a raised position generally adjacent to the bottom of the trailer to a first extended position; and a stabilizing member comprising a first end and a second end, wherein the first end comprises means for attachment to the first base and the second end comprises means for attachment to the bottom of the trailer, wherein the means for attachment to the bottom of the trailer comprises an extension member comprising a slotted plate pivotally attached to the second end, the stabilizing member further comprising length adjustment means wherein the stabilizing member has a first length when the first jack is in the raised position and the stabilizing member has a second length when the first jack is in the first extended position;

wherein the means for attachment to the first base comprises an enclosure which generally conforms to the shape of the first base and encloses the first base, wherein the enclosure is pivotally attached to the stabilizing member.

21. The device of claim 20 wherein the enclosure comprises stabilizer attachment plates.

22. A device for stabilizing a stationary trailer, the trailer having a top and a bottom defining a vertical axis, a front and a back defining a longitudinal axis, a first side and a second side defining a transverse axis perpendicular to the longitudinal axis, and ground engaging wheels attached to the bottom, the device comprising:

a first jack comprising a first trailer engagement means, a first base, and a first extension means disposed between the first trailer engagement means and the first base, wherein the first trailer engagement means is attached to the bottom of the trailer and wherein the first extension means causes the first base to extend from a raised position generally adjacent to the bottom of the trailer to a first extended position;

a stabilizing member comprising a first end and a second end, wherein the first end comprises means for attachment to the first base and the second end comprises a pivotally attached extension member, the bottom of the trailer comprising a receiving bracket; wherein the extension member comprises a slotted plate which attaches to the receiving bracket with fastening means wherein the extension member is located at a first position with respect to the receiving bracket when the first jack is in the raised position and the extension member is located at a second position with respect to the receiving bracket when the first jack is in the first extended position.

23. The device of claim 22 wherein the means for attachment to the first base comprises a first plate pivotally attached to the first end of the stabilizing member, wherein the first plate is affixed to the first base.

24. A device for stabilizing a stationary trailer, the trailer having a top and a bottom defining a vertical axis, a front and a back defining a longitudinal axis, a first side and a second side defining a transverse axis perpendicular to the longitudinal axis, and ground engaging wheels attached to the bottom, the device comprising:
   a first jack comprising a first trailer engagement means, a first base, and a first extension means disposed between the first trailer engagement means and the first base, wherein the first trailer engagement means is attached to the bottom of the trailer and wherein the first extension means causes the first base to extend from a raised position generally adjacent to the bottom of the trailer to a first extended position;
   a stabilizing member comprising a first end and a second end, wherein the first end comprises means for attachment to the first base and the second end comprises a pivotally attached extension member,
   the bottom of the trailer comprising a receiving bracket; wherein the extension member comprises a slotted plate which attaches to the receiving bracket with fastening means wherein the extension member is located at a first position with respect to the receiving bracket when the first jack is in the raised position and the extension member is located at a second position with respect to the receiving bracket when the first jack is in the first extended position.
wherein the means for attachment to the first base comprises an enclosure which generally conforms to the shape of the first base and encloses the first base, wherein the enclosure is pivotally attached to the stabilizing member.

25. The device of claim 22 wherein a plate is pivotally attached to the first base, wherein the stabilizing member is pivotally attached to the plate.

26. The device of claim 22 wherein the first trailer engagement means comprises a first engagement plate.

27. The device of claim 22 wherein the first extension means comprises scissor arms extended by operation of a turn-screw.

28. The device of claim 24 wherein the enclosure comprises stabilizer attachment plates.

29. A device for stabilizing a stationary trailer, the trailer having a top and a bottom defining a vertical axis, a front and a back defining a longitudinal axis, a first side and a second side defining a transverse axis perpendicular to the longitudinal axis, and ground engaging wheels attached to the bottom, the device comprising:
   a first jack comprising a first trailer engagement means, a first base, and a first extension means disposed between the first trailer engagement means and the first base, wherein the first trailer engagement means is attached to the bottom of the trailer and wherein the first extension means causes the first base to extend from a raised position generally adjacent to the bottom of the trailer to a first extended position;
   a second jack comprising a second trailer engagement means, a second base, and a second extension means disposed between the second trailer engagement means and the second base, wherein the second trailer engagement means is aft ached to bottom of the trailer and wherein the second extension means causes the second base to extend from a raised position generally adjacent to the bottom of the trailer to a second extended position;
   a stabilizing member comprising a first end and a second end wherein the first end comprises means for attachment to the first base and the second end comprises an extension member attached thereto, the extension member comprising a slotted plate pivotally attached to the second end;
   a receiving bracket attached to the second trailer engagement means, wherein the receiving bracket is adapted to slidably engage the extension member, the receiving bracket configured such that the extension member is located at a first position with respect to the receiving bracket when the first jack is in the raised position and the extension member is located at a second position with respect to the receiving bracket when the first jack is in the first extended position; and
   the receiving bracket comprising locking means for retaining the extension member in the second position.

30. A method of stabilizing a stationary trailer, the trailer having a top and a bottom defining a vertical axis, a front and a back defining a longitudinal axis, a first side and a second side defining a transverse axis perpendicular to the longitudinal axis, and ground engaging wheels attached to the bottom, the method comprising the steps of:
   positioning the trailer at a desired location;
   manipulating a first jack, wherein the first jack comprises a first trailer engagement means, a first base, and a first extension means disposed between the first trailer engagement means and the first base, wherein the first trailer engagement means is attached to the bottom of the trailer and wherein manipulating the first jack engages the first extension means causing the first base to extend from a raised position generally adjacent to the bottom of the trailer to a first extended position;
   locking the length of a stabilizing member, wherein the stabilizing member comprises a first end and a second end, wherein the first end comprises means for attachment to the first base and the second end comprises means for attachment to the bottom of the trailer, wherein the means for attachment to the first base comprises an enclosure which generally conforms to the shape of the first base and encloses the first base wherein the stabilizing member is pivotally attached to the enclosure, the stabilizing member further comprising length adjustment means wherein the stabilizing member has a first length when the first jack is in the raised position and the stabilizing member has a second length when the first jack is in the first extended position, and wherein the stabilizing member comprises length locking means.

* * * * *

UNITED STATES PATENT AND TRADEMARK OFFICE
CERTIFICATE OF CORRECTION

PATENT NO. : 7,338,052 B2  Page 1 of 1
APPLICATION NO. : 10/899921
DATED : March 4, 2008
INVENTOR(S) : Paul Hanscom It is certified that error appears in the above-identified patent and that said Letters Patent is hereby corrected as shown below:

In column 10, line 8, "means is aft ached" should read -- means is attached --

Signed and Sealed this

Third Day of June, 2008

JON W. DUDAS
*Director of the United States Patent and Trademark Office*